(12) United States Patent
Leung et al.

(10) Patent No.: US 11,288,544 B2
(45) Date of Patent: Mar. 29, 2022

(54) METHOD, SYSTEM AND APPARATUS FOR GENERATING TRAINING SAMPLES FOR MATCHING OBJECTS IN A SEQUENCE OF IMAGES

(71) Applicant: CANON KABUSHIKI KAISHA, Tokyo (JP)

(72) Inventors: Ka Ming Leung, Marsfield (AU); Getian Ye, Kogarah (AU)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 16/785,325

(22) Filed: Feb. 7, 2020

(65) Prior Publication Data

US 2020/0257940 A1    Aug. 13, 2020

(30) Foreign Application Priority Data

Feb. 12, 2019    (AU) .................................. 2019200976

(51) Int. Cl.
*G06K 9/00*    (2006.01)
*G06K 9/62*    (2022.01)
*G06N 3/08*    (2006.01)

(52) U.S. Cl.
CPC ......... *G06K 9/6259* (2013.01); *G06K 9/6215* (2013.01); *G06K 9/6253* (2013.01); *G06K 9/6261* (2013.01); *G06N 3/08* (2013.01)

(58) Field of Classification Search
CPC ...... G06K 9/6255; G06K 9/32; G06K 9/2013; G06K 9/6259; G06K 9/6215; G06K 9/6261; G06K 9/6253; G06K 9/66; G06K 9/4628; G06K 9/6254; G06K 9/344; G06K 9/6216; G06K 9/00228; G06K 9/6407; G06K 9/2009; G06K 9/6423; G06K 9/6476; G06K 9/00084; G06K 9/6263; G06T 7/001;
(Continued)

(56) References Cited

U.S. PATENT DOCUMENTS 9,858,263 B2 * 1/2018 Xiao .................... G06F 16/332
10,019,655 B2 * 7/2018 Krishnamurthy ..... G06F 16/583
10,366,327 B2 * 7/2019 Le ......................... G06F 40/284
(Continued)

OTHER PUBLICATIONS

Alexander Hermans, et al., In Defense of the Triplet Loss for Person Re-Identification, arXiv.org, Mar. 2017, pp. 1-17, arXiv:1703.07737v4 [cs.CV] Nov. 21, 2017.

*Primary Examiner* — Amir Alavi
(74) *Attorney, Agent, or Firm* — Canon U.S.A., Inc. IP Division

(57) ABSTRACT

A method of generating a training sample for matching unlabelled objects in a sequence of images. A first representation of unlabelled objects is generated from images of a first and second set of images. A second representation of the unlabelled objects is generated using an unsupervised method. An anchor image in the first set is selected. A first set of candidate images in the second set that are close to the anchor image in both the first and second representations, is determined. A second set of candidate images in the second set that are distant from the anchor image in either the first or the second representations, is determined. A match candidate image is selected from the first set or the second set of candidate images. The training sample is generated from at least the anchor image and the match candidate image.

14 Claims, 8 Drawing Sheets

(58) Field of Classification Search
CPC ........ G06F 17/30249; G06F 17/30271; G06N 3/08; G06N 99/005; H04N 7/0145
See application file for complete search history.

(56) References Cited

U.S. PATENT DOCUMENTS

| | | | |
|---|---|---|---|
| 10,599,719 B2* | 3/2020 | Sirin | G06N 5/022 |
| 10,664,662 B2* | 5/2020 | Awadallah | G06F 40/216 |
| 10,706,286 B1* | 7/2020 | Muhamed | G06N 20/10 |
| 10,873,456 B1* | 12/2020 | Dods | G06N 3/0445 |
| 10,878,583 B2* | 12/2020 | Schmid | G06N 3/0454 |
| 10,922,840 B2* | 2/2021 | Viswanathan | G06K 9/6232 |
| 2019/0347550 A1* | 11/2019 | Jung | G06N 3/084 |
| 2020/0257940 A1* | 8/2020 | Leung | G06K 9/6261 |
| 2021/0182548 A1* | 6/2021 | Ayyadevara | G06K 9/00449 |
| 2021/0319266 A1* | 10/2021 | Chen | G06K 9/6263 |

\* cited by examiner

METHOD, SYSTEM AND APPARATUS FOR GENERATING TRAINING SAMPLES FOR MATCHING OBJECTS IN A SEQUENCE OF IMAGES

REFERENCE TO RELATED PATENT APPLICATION

This application claims the benefit under 35 U.S.C. § 119 of the filing date of Australian Patent Application No. 2019200976, filed Feb. 12, 2019, hereby incorporated by reference in its entirety as if fully set forth herein.

TECHNICAL FIELD

The present invention relates generally to image processing and, in particular, to generating a training sample for matching unlabelled objects in a sequence of images. The present invention also relates to a method, apparatus and system for performing person re-identification for images captured by at least two cameras, and to a computer program product including a computer readable medium having recorded thereon a computer program for generating a training sample for matching unlabelled objects in a sequence of images.

BACKGROUND

Public venues such as shopping centres, parking lots and train stations are increasingly subject to surveillance using large-scale networks of video cameras. Application domains of large-scale video surveillance include security, safety, traffic management and business analytics. In one example application from the security domain, a security officer may want to view a video feed containing a particular suspicious person in order to identify undesirable activities. In another example from the business analytics domain, a shopping centre may wish to track customers across multiple cameras in order to build a profile of shopping habits.

Many surveillance applications require methods, known as "video analytics", to detect, track, match and analyse multiple objects of interest across multiple camera views. In one example, referred to as a "hand-off" application, object matching is used to persistently track multiple objects across first and second cameras with overlapping fields of view. In another example application, referred to as "re-identification", object matching is used to locate a specific object of interest across multiple cameras in the network with non-overlapping fields of view.

Cameras at different locations may have different viewing angles and work under different lighting conditions, such as indoor and outdoor. The different viewing angles and lighting conditions may cause the visual appearance of a person to change significantly between different camera views. In addition, a person may appear in a different orientation in different camera views, such as facing towards or away from the camera, depending on the placement of the camera relative to the flow of pedestrian traffic. Robust person re-identification in the presence of appearance change due to camera viewing angle, lighting and person orientation is difficult.

A person re-identification model consists of an appearance descriptor extraction and a distance metric model. An appearance descriptor is a feature vector representing the appearance of a person. An appearance descriptor is a derived value or set of derived values determined from the pixel values in an image of a person. An appearance descriptor may be directly extracted from an image. One example of an appearance descriptor is a histogram of colour values. Another example of an appearance descriptor is a histogram of quantized image gradient responses. An appearance descriptor extractor may also be learned from a set of training images containing different persons using a supervised learning method or an unsupervised learning method. For example, a deep convolutional neural network may be learned in a supervised manner to separate training images based on the identity of a person. An appearance descriptor is then derived from one or more top layers of the learned deep neural network. A deep neural network may also be learned in an unsupervised manner to reconstruct input training images without any knowledge of persons' identities. An appearance descriptor is then derived from one or more top layers of the learned deep neural network.

Given an image of a person in a camera view, a distance metric model may be used to determine distances from the image to a set of images in another camera view. The image with the smallest distance to the given image is considered as the closest match. A good distance metric needs to be selected for the performance of person re-identification. General-purpose distance metrics, e.g., Euclidean distance and cosine distance, are commonly used by a distance metric model. A distance metric model may also be learned from a training dataset using a supervised learning method or an unsupervised method. In most known supervised and unsupervised learning methods, a projection is learned from appearance descriptors extracted from training images of people captured from a pair of cameras. During the re-identification process, the learned projection is used to project appearance descriptors to a subspace and calculate the distances between the projected appearance descriptors. Supervised learning methods require labelled training samples. A training sample, known as a pairwise training sample, may contain a pair of appearance descriptors extracted from a pair of training images captured by two different cameras. In the training image pair, one image is labelled as "anchor" image and the other image is labelled as "positive" or "negative" image. The "anchor" image is an image of a person captured by a first camera. The "positive" image or "negative" image is captured by a second camera. The "positive" image contains the same person as the "anchor" image. The "negative" image contains a person different from the person in the "anchor" image. The appearance descriptors corresponding to the "anchor" image, "positive" image, and "negative" image are known as "anchor" descriptor, "positive" descriptor, and "negative" descriptor respectively.

A training sample may also contain three appearance descriptors extracted from three training images labelled as "anchor" image, "positive" image, and "negative" image. The training sample containing three appearance descriptors is known as a triplet training sample. Unsupervised learning methods do not require labelled training samples.

Supervised and unsupervised learning methods fail when the distribution of appearance descriptors corresponding to training images is vastly different from the distribution of appearance descriptors corresponding to testing images. The training images may be referred to as source domain images and the testing images may be referred to as target domain images. A source domain is where a person re-identification model is trained. A target domain is where a pre-trained person re-identification model is deployed. The disparity in the distributions of appearance descriptors between the source and target domain is referred to as the domain shift problem. The degree of the disparity in the distributions is referred to as a domain gap. If the domain gap between the source and target domain is large, the domain similarity between the source and target domain is small and a person re-identification model learned on source domain images does not perform well on target domain images. For example, a person re-identification model may be learned on images captured from a pair of cameras in a shopping mall (indoor environment) and then used on images captured from a pair of cameras in a park (outdoor environment). The learned re-identification model will not perform well because the change in appearance in the images caused by the changes in lighting and other environmental conditions deteriorate the performance of the re-identification model. If the domain gap between the source and target domain is large, the person re-identification model needs to be updated using training images collected from cameras in the target domain. The training images collected from the target domain are referred to as "target domain training images".

A person re-identification model may be updated in a supervised manner using labelled training samples collected from the target domain. In some known supervised methods, a projection is learned with information related to whether images in training samples are positive or negative training images. In one known method, known as "distance metric learning", a projection is learned to minimize a distance between the anchor descriptor and positive descriptor and maximize the distance between the anchor descriptor and negative descriptor in each pairwise training sample. In another method, known as "linear discriminative analysis", a set of projections are learned to separate negative descriptors from anchor and positive descriptors in a common subspace. In another method, known as "canonical correlation analysis", a set of projections are learned to maximize the correlation between anchor descriptors and positive descriptors in each training sample in a common subspace. In another method, known as "triplet-based distance metric learning", a projection is learned to ensure the distance between the anchor descriptor and positive descriptor in each triplet training sample to be less than the distance between the anchor descriptor and negative descriptor in the same triplet training sample. In another method, known as "triplet-based deep metric learning", a deep neural network is learned to ensure the distance between the anchor descriptor and positive descriptor in each triplet training sample to be less than the distance between the anchor descriptor and negative descriptor in the same triplet training sample.

The supervised learning methods may be impractical due to the need for labelled training images from the target domain. In practice, generating a set of labelled training images is time consuming and requires intense manual labour. Furthermore, people may appear infrequently in some camera views, such as remote perimeters, making the collection of a large set of labelled training images impractical. Therefore, methods, known as "unsupervised learning", resort to learning a discriminative representation of appearance descriptors without the need to capture large quantities of labelled training images in every pair of cameras. Unsupervised learning methods find a set of projections to project appearance descriptors into a subspace where a better re-identification performance can be achieved without any knowledge of labelling information on training images from the target domain.

In some known unsupervised methods for person re-identification, known as "dictionary learning", a "dictionary" is learned to encode a compact, discriminative representation of an appearance descriptor. A dictionary consists of a set of dictionary "atoms" or basis vectors. An appearance descriptor of a person may be reconstructed as a linear weighted sum of dictionary atoms, each atom being weighted by a coefficient. The coefficients for all dictionary atoms collectively form a "code". Given an appearance descriptor, the corresponding code is determined by finding the weighted sum of dictionary atoms that minimizes a difference, known as a "reconstruction error", between the appearance descriptor and a reconstruction of the appearance descriptor using the dictionary atoms. A dissimilarity score (e.g., Euclidean distance), between the codes of a pair of images determines if the pair of image is matched.

Another known unsupervised method for person re-identification, known as "cross-view asymmetric metric learning", learns a specific projection for each camera view by grouping appearance descriptors to a set of clusters using a clustering algorithm (e.g., K-means algorithm). With the learned projections, appearance descriptors from different camera views are projected to a shared subspace where the images of persons with a similar appearance belong to the same cluster.

Without any knowledge of labelling information on target domain training images, unsupervised methods often achieve much lower performance than supervised methods. Furthermore, the performance of an unsupervised method deteriorates when the training dataset contains noisy training images or outlier training images. A noisy image is an image containing noises such as variations of brightness or colors and compression artefacts. An outlier image is an image that will not be beneficial for updating a person re-identification model.

A need exists for training image selection that can select target domain training images for effectively updating a person re-identification model.

SUMMARY

It is an object of the present invention to substantially overcome, or at least ameliorate, one or more disadvantages of existing arrangements.

Disclosed are arrangements relating to selecting training images captured from a pair of cameras in a target domain for updating a person re-identification model.

According to one aspect of the present disclosure, there is provided a method of generating a training sample for matching unlabelled objects in a sequence of images, comprising:

generating a first representation of unlabelled objects from images of a first and second set of images;

generating a second representation of the unlabelled objects using an unsupervised method, the unsupervised method learning a manifold of the unlabelled objects in the first representation;

selecting an anchor image in the first set;

determining a first set of candidate images in the second set that are close to the anchor image in both the first and second representations;

determining a second set of candidate images in the second set that are distant from the anchor image in either the first or the second representations;

selecting a match candidate image from the first set or the second set of candidate images; and generating the training sample from at least the anchor image and the match candidate image.

According to another aspect of the present disclosure, there is provided a system for generating a training sample for matching unlabelled objects in a sequence of images, the system comprising:

a memory for storing data and a computer program;
a processor coupled to the memory for executing the computer program, the program comprising instructions for:
generating a first representation of unlabelled objects from images of a first and second set of images;
generating a second representation of the unlabelled objects using an unsupervised method, the unsupervised method learning a manifold of the unlabelled objects in the first representation;
selecting an anchor image in the first set;
determining a first set of candidate images in the second set that are close to the anchor image in both the first and second representations;
determining a second set of candidate images in the second set that are distant from the anchor image in either the first or the second representations;
selecting a match candidate image from the first set or the second set of candidate images; and
generating the training sample from at least the anchor image and the match candidate image.

According to still another aspect of the present disclosure, there is provided an apparatus for generating a training sample for matching unlabelled objects in a sequence of images, the apparatus comprising:
means for generating a first representation of unlabelled objects from images of a first and second set of images;
means for generating a second representation of the unlabelled objects using an unsupervised method, the unsupervised method learning a manifold of the unlabelled objects in the first representation;
means for selecting an anchor image in the first set;
means for determining a first set of candidate images in the second set that are close to the anchor image in both the first and second representations;
means for determining a second set of candidate images in the second set that are distant from the anchor image in either the first or the second representations;
means for selecting a match candidate image from the first set or the second set of candidate images; and
means for generating the training sample from at least the anchor image and the match candidate image.

According to still another aspect of the present disclosure, there is provided a non-transitory computer readable medium having a computer program stored on the medium for generating a training sample for matching unlabelled objects in a sequence of images, the program comprising:
code for generating a first representation of unlabelled objects from images of a first and second set of images;
code for generating a second representation of the unlabelled objects using an unsupervised method, the unsupervised method learning a manifold of the unlabelled objects in the first representation;
code for selecting an anchor image in the first set;
code for determining a first set of candidate images in the second set that are close to the anchor image in both the first and second representations;
code for determining a second set of candidate images in the second set that are distant from the anchor image in either the first or the second representations;
code for selecting a match candidate image from the first set or the second set of candidate images; and
code for generating the training sample from at least the anchor image and the match candidate image.

According to still another aspect of the present disclosure, there is provided a method of identifying an object in an image captured in a first scenario and a second scenario having different viewpoints or environments to the first scenario, the method comprising:
inputting a data set including images of an object captured in the first scenario and the second scenario, the images including at least images of the object captured in the first scenario and the second scenario; and
identifying an object in the first scenario and the second scenario using a machine learning model trained using the data set to match images being common nearest neighbours which are distant from an anchor image and a manifold of the object in an Euclidean space, wherein images that are closest to the anchor image in the Euclidean space and are not nearest neighbours to the anchor image or the manifold are considered not to match.

According to still another aspect of the present disclosure, there is provided an apparatus for identifying an object in an image captured in a first scenario and a second scenario having different viewpoints or environments to the first scenario, the apparatus comprising:
means for inputting a data set including images of an object captured in the first scenario and the second scenario, the images including at least images of the object captured in the first scenario and the second scenario; and
means for identifying an object in the first scenario and the second scenario using a machine learning model trained using the data set to match images being common nearest neighbours which are distant from an anchor image and a manifold of the object in an Euclidean space, wherein images that are closest to the anchor image in the Euclidean space and are not nearest neighbours to the anchor image or the manifold are considered not to match.

According to still another aspect of the present disclosure, there is provided a system for identifying an object in an image captured in a first scenario and a second scenario having different viewpoints or environments to the first scenario, the system comprising:
a memory for storing data and a computer program;
a processor coupled to the memory for executing the computer program, the program comprising instructions for:
inputting a data set including images of an object captured in the first scenario and the second scenario, the images including at least images of the object captured in the first scenario and the second scenario;
identifying an object in the first scenario and the second scenario using a machine learning model trained using the data set to match images being common nearest neighbours which are distant from an anchor image and a manifold of the object in an Euclidean space, wherein images that are closest to the anchor image in the Euclidean space and are not nearest neighbours to the anchor image or the manifold are considered not to match.

According to still another aspect of the present disclosure, there is provided a computer readable medium having a program stored on the medium for identifying an object in an image captured in a first scenario and a second scenario having different viewpoints or environments to the first scenario, the program comprising:
code for inputting a data set including images of an object captured in the first scenario and the second scenario, the images including at least images of the object captured in the first scenario and the second scenario; and code for identifying an object in the first scenario and the second scenario using a machine learning model trained using the data set to match images being common nearest neighbours which are distant from an anchor image and a manifold of the object in an Euclidean space, wherein images that are closest to the anchor image in the Euclidean space and are not nearest neighbours to the anchor image or the manifold are considered not to match.

Other aspects of the present invention are also disclosed.

BRIEF DESCRIPTION OF THE DRAWINGS

One or more example embodiments of the invention will now be described with reference to the following drawings, in which.

DESCRIPTION OF THE EMBODIMENTS

Figure 1:
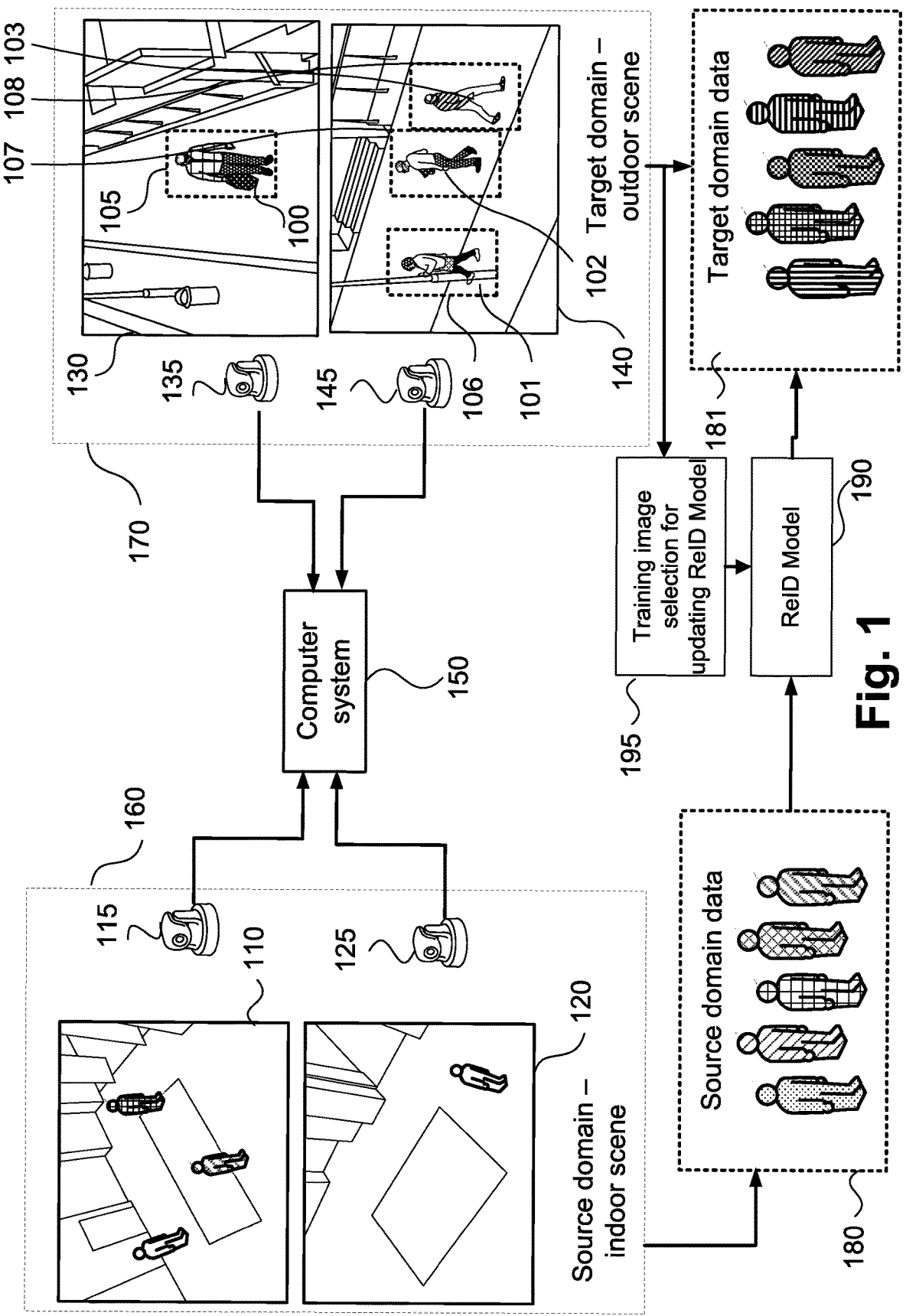
FIG. 1 shows a surveillance system comprising cameras connected to a computer system for analysing objects of interest, to which the arrangements of training image selection may be applied.

Where reference is made in any one or more of the accompanying drawings to steps and/or features, which have the same reference numerals, those steps and/or features have for the purposes of this description the same function (s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventors or the patent applicant that such documents or devices in any way form part of the common general knowledge in the art.

An image, such as an image 110 in FIG. 1, is made up of visual elements. The image 110 is captured using an image capture device such as a digital camera or video camera. The term "pixel", also referred to as a "pixel location" or "image location", refers in the present disclosure to one of the visual elements in a captured image. Each pixel of an image is described by one or more values characterising a property of a scene captured in the image. In one example, a single intensity value characterises a brightness of the scene at a pixel location. In another example, a triplet of values characterise a colour of the scene at the pixel location.

A "region", also referred to as an "image region", in an image refers to a collection of one or more spatially adjacent visual elements. A "bounding box" refers to a rectilinear image region enclosing an object or part of an object in an image. In one example, the bounding box 105 in FIG. 1 encloses a person 100. A "feature", also referred to as an "appearance descriptor" or "descriptor", represents a derived value or set of derived values determined from the pixel values in an image region. One example of a descriptor is a histogram of colour values in an image region. Another example is a histogram of quantized image gradient responses in a region.

The phrase "foreground mask" refers to a binary image with non-zero values at pixel locations corresponding to an object of interest. In one example, the terms "candidate object" and "object of interest" refer to a person in a crowd that has been identified as being of particular interest. A non-zero pixel location in a foreground mask is known as a "foreground pixel". In one arrangement, a foreground mask is determined using a statistical background pixel modelling method such as Mixture of Gaussian (MoG), wherein the background model is maintained over multiple frames with a static camera. In another arrangement, foreground detection is performed on Discrete Cosine Transform blocks. In yet another arrangement, a foreground mask is determined using unsupervised segmentation, for example, using superpixels. Any suitable method for determining a foreground mask may equally be practised.

FIG. 1 illustrates an example use case to which training image selection arrangements may be applied. In the example of FIG. 1, training images from the target domain 170, which is an outdoor scene (e.g. a street), may be selected to update the person re-identification model 190 pre-trained in the source domain 160, which is an indoor scene (e.g., an airport, shopping mall, hospital). In the example of FIG. 1, the indoor scene 160 has two cameras 115 and 125 which capture two non-overlapping viewpoints 110 and 120. The cameras 115 and 125 are connected to a computer system 150.

While the example of FIG. 1 describes a scenario where the cameras 115 and 125 capture non-overlapping viewpoints 110 and 120, other arrangements are also possible. For example, in other arrangements, images of the object of interest and candidate objects are captured by different cameras simultaneously or at different times, or captured by the same camera at different times, including images that represent the same scene or different scenes, or multiple scenes with different candidate objects. Methods are described below for identifying an object in an image captured in a first scenario and a second having different viewpoints or environments to the first scenario. In one arrangement, steps may be performed for inputting a data set including images of an object captured in the first scenario and the second scenario, the images including at least images of the object captured in the first scenario and the second scenario. Then, steps may be performed for identifying an object in the first scenario and the second scenario using a machine learning model trained using the data set to match images being common nearest neighbours which are distant from an anchor image and a manifold of the object in an Euclidean space. In one arrangement, images that are closest to the anchor image in the Euclidean space and are not nearest neighbours to the anchor image or the manifold are considered not to match.

In the example of FIG. 1, the person re-identification model 190 may be pre-trained using images within source domain data 180 captured from the cameras 115 and 125 in the source domain 160. In one arrangement, the appearance descriptor in a person re-identification model 190 may be determined using a histogram of pixel colours and image gradients within predefined spatial cells of a rectified image. Another example of an appearance descriptor is a WHOS descriptor. The appearance descriptor extractor in the person re-identification model 190 may also be learned using a supervised learning method (e.g., a deep convolutional neural network), or an unsupervised learning method (e.g., an auto-encoder). In one arrangement, the distance metric model in the person re-identification model may be learned on training samples from the source domain dataset 180 using a supervised learning method (e.g, kernel local Fisher discriminant analysis), or an unsupervised learning method (e.g., dictionary learning).

After the person re-identification model 190 is trained, the person re-identification model 190 is deployed to the target domain 170 to match images in the target domain dataset 181 captured from cameras 135 and 145, which correspond to two non-overlapping viewpoints 130 and 140, respectively. The cameras 135 and 145 are connected to the computer system 150. In the example of FIG. 1, a first object from a camera view is known as a "query" object, and a second object from the other camera view is known as a "gallery" object. A query object may be a person who has been identified as being suspicious in a street, and a gallery object is a person in another crowded street, the person being merely a member of the crowd. The gallery object may also be referred to as a "candidate object". The camera view where the query object is captured is referred to as query camera. The camera view where the gallery object is captured is referred to as gallery camera. The appearance descriptors of a query object and a gallery object are referred to as query descriptor and gallery descriptor, respectively. In one example, a person 100 in an image 130 is a query object, and three people 101, 102 and 103 in an image 140 are gallery objects. The image 130 and the image 140 are query image and gallery image, respectively. The person re-identification model 190 is applied to determine which of the three gallery objects 101, 102 and 103 is a best match for the query object 100.

The example of FIG. 1 may be applied to a range of applications. In one example, the computer system 150 allows a security guard to select a query object through an interactive user interface, and return images of one or more gallery objects determined to match the query object. In another example, the computer system 150 automatically selects a query object and matches the object across multiple distributed cameras in order to analyse the long-term behaviour of the object. In other arrangements, the computer system 150 is integrated into one of the cameras 135 and 145. While the examples in this disclosure generally relate to surveillance tasks of monitoring persons, the described methods may equally be practised on other types of objects. For example, the described methods may be applied to track a suspicious vehicle. The described methods may also be implemented using different types of sensors including near infra-red (IR) cameras, radar sensors, and laser scanners.

Before deploying the person re-identification model 190 to the target domain outdoor scene 170, there is a need for a training image selection module 195 to select training images from the target domain data 181 for updating the person re-identification model 190 so that the person re-identification model 190 performs well in the target domain 170. The training images selected by the training image selection module 195 originate from a training data set, collected from the query and gallery cameras. For the example shown in FIG. 1, the training data 181 is collected from cameras 135 and 145 in the target domain 170 during a training phase of operation. The query and gallery objects may be matched by extracting an appearance descriptor for the query object 100 from a bounding box 105, and appearance descriptors for the gallery objects 101, 102 and 103 from the bounding boxes 106, 107 and 108, respectively. A distance is determined between the query object and each gallery object based on the appearance descriptors. The gallery object with the smallest distance to the query object is determined to have the same identity as the query object. The distance is in part based on a learned representation of object appearance determined by an unsupervised learning method. The learned representation is derived from the selected training images of objects of the same type as the query and gallery object without knowledge of the identity of the object in each image.

Figure 2A:
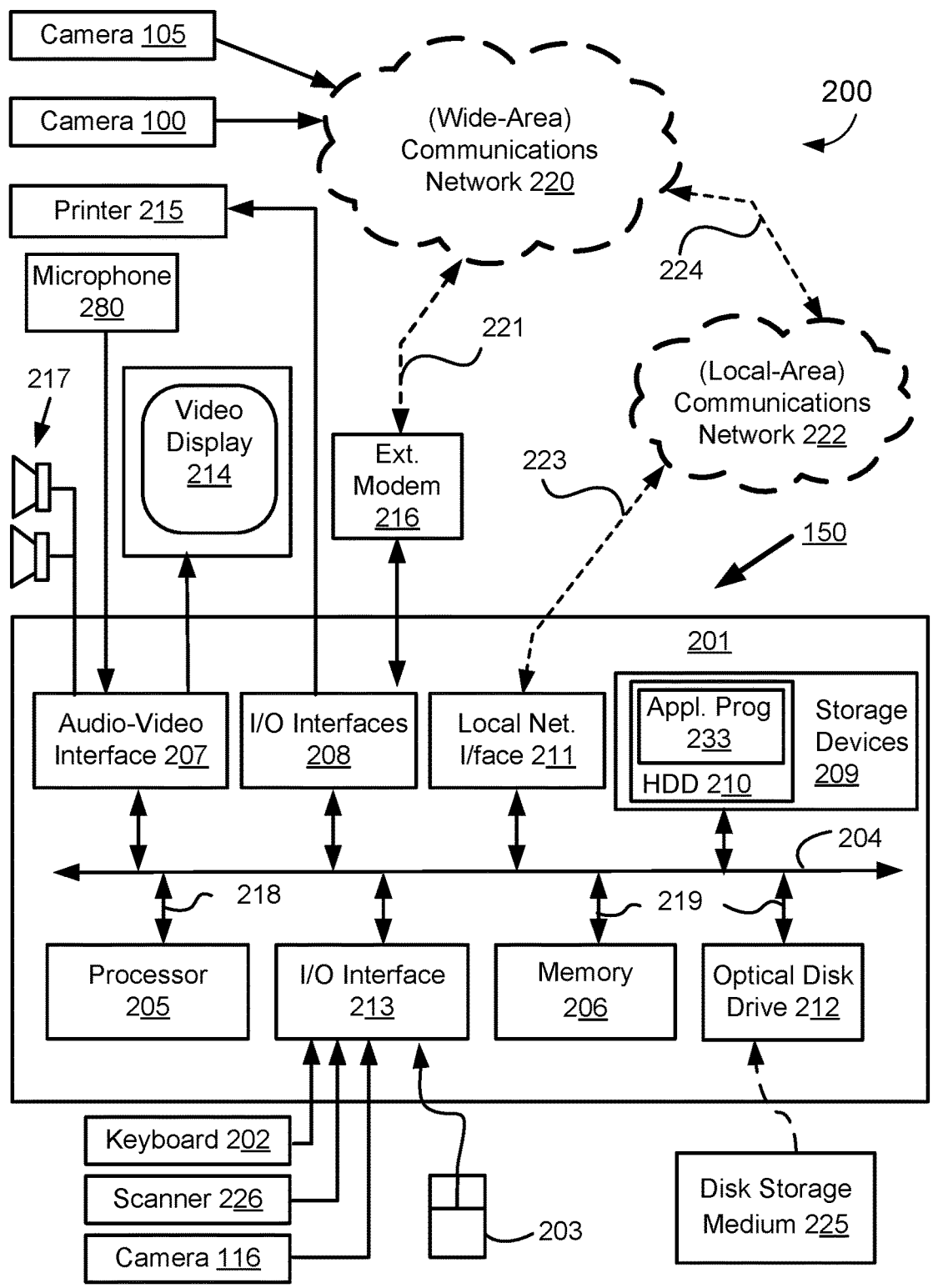
FIGS. 2A and 2B form a schematic block diagram of the computer system of FIG. 1 upon which the arrangements described can be practiced.
Figure 2B:
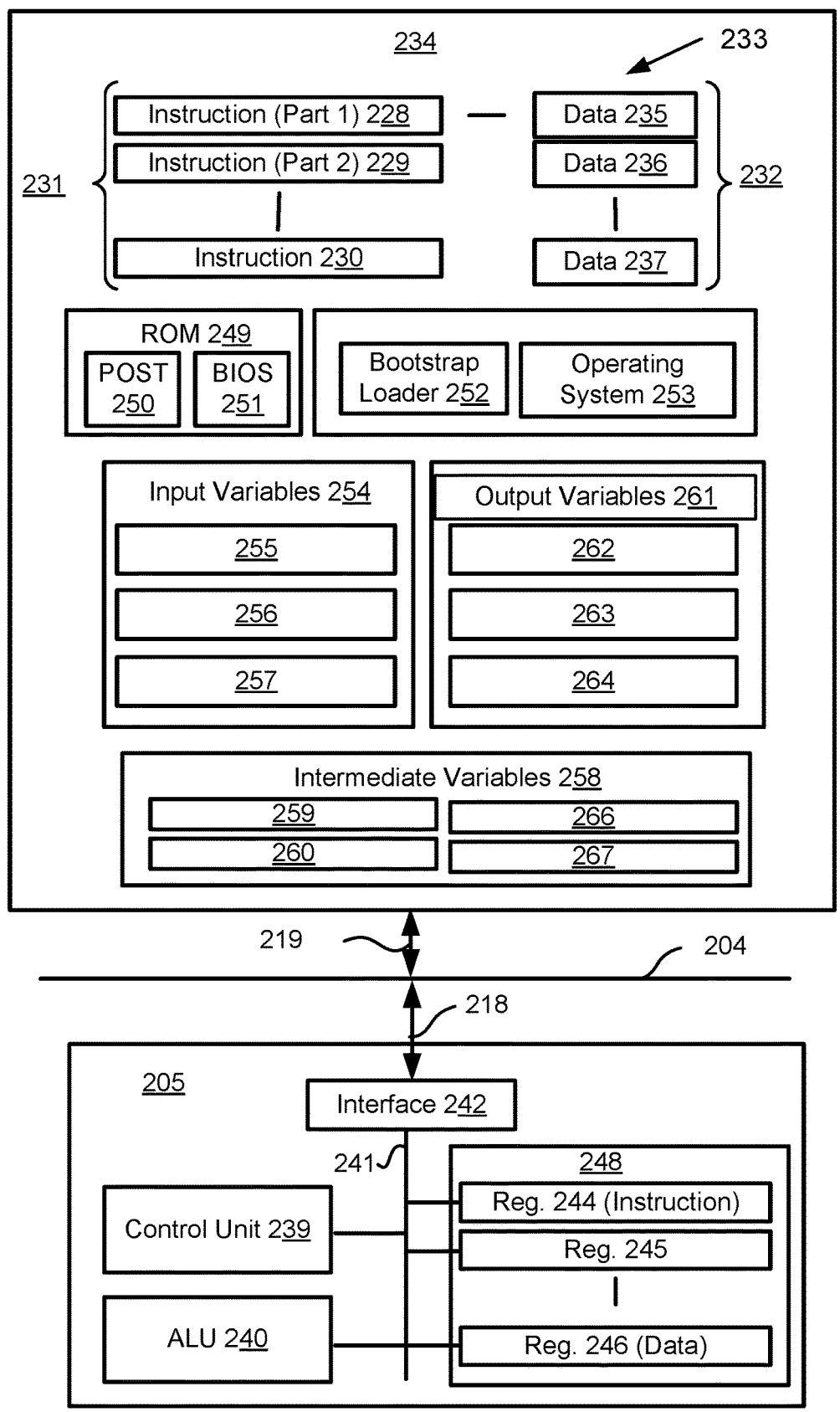

FIGS. 2A and 2B depict the computer system 200, upon which the arrangements described can be practised.

As seen in FIG. 2A, the computer system 200 includes: a computer module 201; input devices such as a keyboard 202, a mouse pointer device 203, a scanner 226, one or more cameras such as a camera 116, and a microphone 280; and output devices including a printer 215, a display device 214 and loudspeakers 217. An external Modulator-Demodulator (Modem) transceiver device 216 may be used by the computer module 201 for communicating to and from the computer system 150 over the communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

In the example of FIG. 1, the cameras 115. 125, 135 and 145 are video cameras. However, any type of image capture devices capable of capturing image and/or video data from which vanishing points can be determined may be used in described arrangements. In one arrangement, a plurality of a single type of image capture device may be used. In other arrangements, image capture devices integral or proximate to the computer module 201, such as the camera 116, may be used together with the cameras 115. 125, 135 and 145.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 116 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth® wireless arrangement or an IEEE 802.11 wireless arrangement; however, numerous other types of interfaces may be practiced for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun Sparcstations, Apple Mac™ or a like computer systems.

Methods described below may be implemented using the computer system 200 wherein the processes of FIGS. 3, 4, 5, and 6, to be described, may be implemented as one or more software application programs 233 executable within the computer system 200. In particular, the steps of the described methods are effected by instructions 231 (in FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the methods described and a second part and the corresponding code modules manage a user interface between the first part and the user. In other arrangements, one or more steps of the processes of FIGS. 3, 4, 5 and 6 may be implemented on the computer system 150 which has a similar configuration to the computer system 200.

The software 233 may be stored in a computer readable medium, including the storage devices described below, for example. The software 233 is typically stored in the HDD 210 or the memory 206. The software is loaded into the computer system 200 from the computer readable medium, and then executed by the computer system 200. Thus, for example, the software 233 may be stored on an optically readable disk storage medium (e.g., CD-ROM) 225 that is read by the optical disk drive 212. A computer readable medium having such software or computer program recorded on the computer readable medium is a computer program product. The use of the computer program product in the computer system 150 preferably effects an advantageous apparatus for implementing the methods described.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using the connection 218. The memory 234 is coupled to the bus 204 using the connection 219.

The application program 233 includes the sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The arrangements described use input variables 254, which are stored in the memory 234 in corresponding memory locations 255, 256, 257. The arrangements described produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;
a decode operation in which the control unit 239 determines which instruction has been fetched; and
an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 3, 4, 5 and 6 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The methods described may alternatively be implemented in dedicated hardware such as one or more integrated circuits performing the functions or sub functions. Such dedicated hardware may include graphic processors, digital signal processors, or one or more microprocessors and associated memories, and may reside on platforms such as video cameras.

Figure 3:
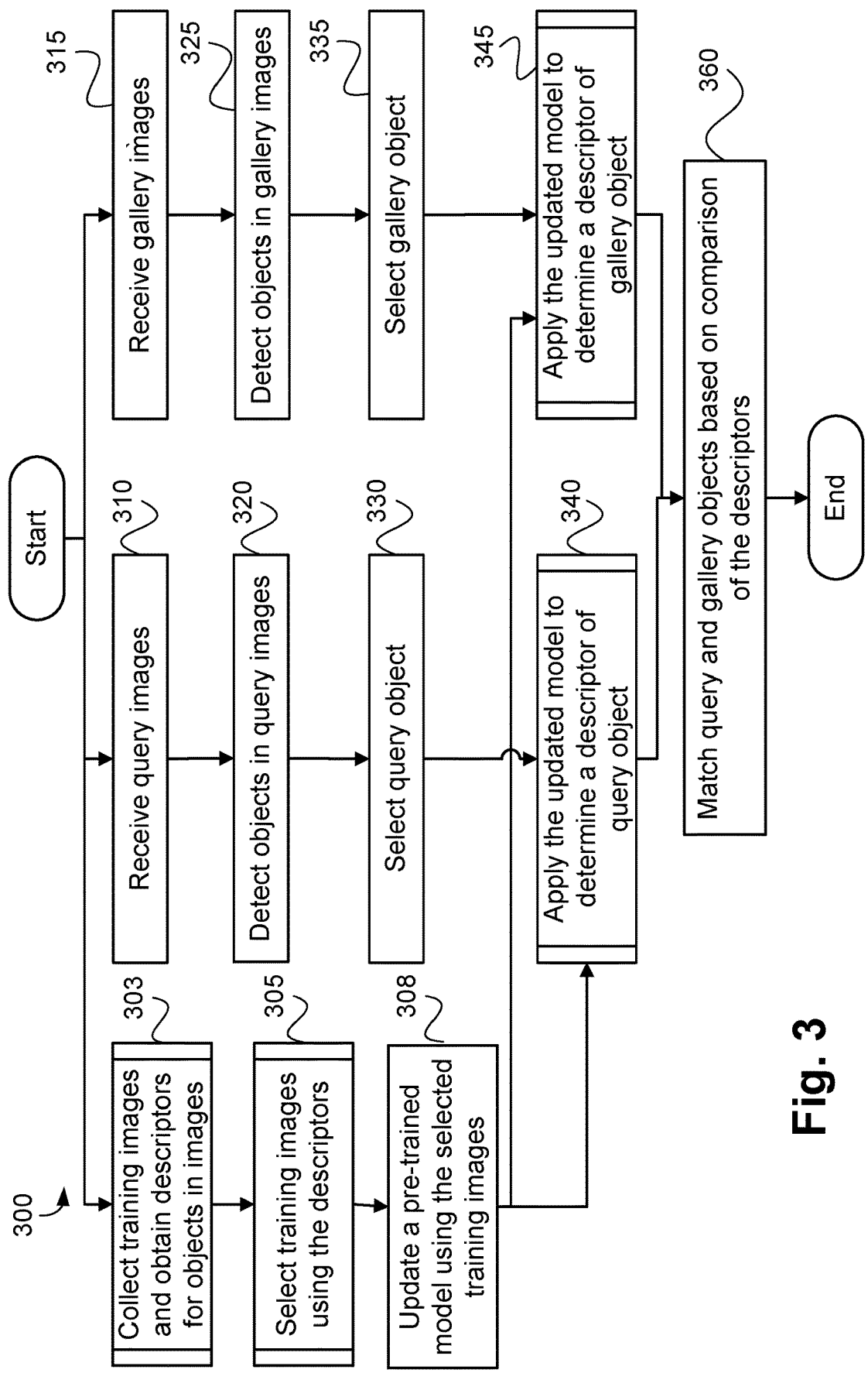
FIG. 3 is a schematic flow diagram showing a method of matching objects between a query image and a gallery image using an updated person re-identification model.

FIG. 3 shows a method 300 of matching objects between images by comparing descriptors of objects determined using a trained person re-identification model 190.

In one example, the matching method 300 is used to determine a gallery object in an image matched to a query object. The method 300 is typically implemented by one or more software code modules of the application 233, stored in the hard disk drive 210 and controlled under execution of the processor 205. In some arrangements, one or more steps of the method 300 are executed by a processor of the computer system 150.

The method 300 is described by way of example with reference to the query image 130 containing the object of interest 100 detected at the bounding box 105, and the gallery image 140 containing candidate objects 101, 102 and 103, detected at the bounding boxes 106, 107 and 108, respectively. In the example described, the method 300 is used to determine which of the detections 106, 107 and 108 is the object of interest 100, detected at the bounding box 105. The following description provides details, examples and alternative implementations for the main steps of the method 300. Further details, examples and alternative implementations of step 303, 305, 340 and 345 are described hereinafter.

The method 300 starts at an image collection and descriptor generation step 303. At step 303, the method 300 collects training images from the query and gallery cameras 135 and 145 of FIG. 1 and determines descriptors for detected objects in the training images. In the example of FIG. 1, the training images are processed on the computer system 150 to determine descriptors from a pre-trained re-identification model 190 trained from source domain data 180. The determined descriptors are then transmitted to the computer module 201, via the network 220, and are used to select training images for updating the pre-trained model. In other arrangements, the training images are transmitted to the computer module 201 for processing. In yet other arrangements, image processing and the determination of descriptors from images of detected objects are processed on the computer system 150. A method 400 of collecting training data and determining descriptors of detected objects, as executed at step 303 of method 300, is described hereinafter with reference to FIG. 4. The output of step 303 is a set of descriptors of detected objects in training images from the query and gallery cameras 135 and 145. The set of descriptors may be stored in the memory 206.

The method 300 progresses under execution of the processor 205 from the image collection and descriptor determination step 303 to a selecting step 305. At step 305, the method 300 selects training images using the received descriptors of detected objects. In some arrangements, the training image selection based on the received descriptors associated to the detected objects are processed on the computer system 150. In other arrangements, image selection is performed at a cloud computing server (not shown)

connected to the network 220 based on the received descriptors resided in the cloud computing server. A method 600 of selecting positive and negative training images corresponding to anchor images, as executed at step 305 of method 300, is described hereinafter with reference to FIG. 6. The output of step 305 is a set of anchor images and the selected positive and negative training images to be used for updating the pre-trained re-identification model 190.

The method 300 progresses under execution of the processor 205 from the selecting step 305 to an updating step 308. At step 308, the method 300 updates a pre-trained re-identification model using the anchor images and the selected positive and negative training images. As described below, good positive samples and good negative training images may be used for training the re-identification model. A re-identification model consists of a descriptor extractor and a distance metric model. In one arrangement, WHOS descriptors or colour histogram descriptors are extracted from training images. The WHOS descriptors are then used to train a distance metric model by using a supervised learning method (e.g., kernel local Fisher discriminant analysis), or an unsupervised learning method (e.g., dictionary learning). In another arrangement, the descriptor extractor is learned from training images by using a supervised learning method (e.g., a deep convolutional neural network), or an unsupervised learning method (e.g., an auto-encoder). The descriptors are then directly used to train a distance metric model by using a supervised learning method (e.g., kernel local Fisher discriminant analysis), or an unsupervised learning method (e.g., dictionary learning). A distance metric model may also be created by selecting a general-purpose distance metrics (e.g., Euclidean distance and cosine distance), without any learning process. The output of step 308 is an updated re-identification model which consists of an extractor for determining descriptors of objects and a distance metric model for comparing descriptors of detected objects.

Independent of steps 303, 305, and 308, the method 300 also starts at a receiving step 310. At execution of the step 310, at least one image containing a query object is received as input. For example, the image 130 is a query image received from a query camera 135 containing a query object 100. The image 130 may be stored in the memory 206. The method 300 progresses under execution of the processor 205 from the receiving step 310 to a detecting step 320. The detecting step 320 executes to detect a query object from the received query images. One example of detecting the query object uses a pedestrian detection method to detect all persons in the query images. A commonly-used pedestrian detection method learns a detector to search for persons within an image by scanning pixel locations. The detector produces a high score if the local image features inside the local search window meet certain criteria. The local image feature may be the histogram of oriented gradients or local binary pattern. Other pedestrian detection methods include a part-based detection method and a background subtraction method. The output of the pedestrian detection method is a set of bounding boxes. The image region defined by each bounding box contains a person.

The method 300 progresses under execution of the processor 205 from the detecting step 320 to a selecting step 330. In one arrangement, a user such as a security guard manually selects an automatically detected bounding box, such as the bounding box 105, as the query object via a graphical user interface executing on the module 201. In another arrangement, the user manually draws a bounding box containing an object to define the query object via a graphical user interface executing on the module 201. In yet another arrangement, an algorithm executing on the module 201 automatically selects an automatically detected bounding box, such as the bounding box 105, as the query object based on pre-defined rules. The output of step 330 is an image region within a bounding box for the query object.

The method 300 progresses under execution of the processor 205 from the step 330 to a determining step 340. A descriptor for the query object is determined at step 340 using a descriptor extractor determined at step 308 based on pixels in the image region determined at step 330. A method 500 of determining a descriptor of an object, as executed at step 340, will be described hereinafter with reference to FIG. 5. The output of step 340 is a descriptor characterizing the query object. The descriptor may be stored in the memory 206.

As seen in FIG. 3, the method 300 also starts at a receiving step 315. In one arrangement, steps 303, 310 and 315 start concurrently. In another arrangement, steps 303, 310 and 315 are executed at different times. In one arrangement, step 303 is executed before steps 340 and 345. In some arrangements, step 305 is executed during an initial installation or "training" phase, while the remaining steps in method 300 are executed during routine operation after the "training" phase has finished. Furthermore, steps 340 and 345 are executed before step 360.

At execution of step 315, at least one image containing gallery objects is received as input. For example, the image 140 is a gallery image received from a gallery camera 145 in the target domain containing gallery objects 101, 102 and 103. The method 300 progresses under execution of the processor 205 from step 315 to a detecting step 325. At step 325, a set of gallery objects is detected in the received gallery images. In one arrangement, step 325 is implemented for gallery objects in a similar manner to step 320 for query objects. The output of step 325 is a set of bounding boxes, such as the bounding boxes 106, 107 and 108 corresponding to the gallery objects 101, 102 and 103 respectively.

The method 300 progresses under execution of the processor 205 from step 325 to a selecting step 335. At the selecting step 335, a gallery object is selected for comparing with the query object determined at step 330. In one arrangement, the gallery objects determined at detecting step 325 are stored in a list, for example in the memory 206, and a gallery object is selected by enumerating the objects in the list. In other arrangements, step 335 is implemented for gallery objects in a similar manner to step 330 for query objects. The output of the selecting step 335 is an image region within a bounding box for the gallery object. The image region output at step 335 may be stored in the memory 206.

The method 300 progresses under execution of the processor 205 from the step 335 to a determining step 345. A descriptor for the gallery object is determined at step 345 using a descriptor extractor determined by step 308 based on pixels in the image region determined at step 335. Further details, examples and alternative implementations of the step 345 are described hereinafter with reference to FIG. 5. The output of step 345 is a descriptor characterizing the gallery object. Again, the descriptor determined at step 345 may be stored in the memory 206.

The method 300 progresses under execution of the processor 205 from steps 340 and 345 to a matching step 360. At the matching step 360, the descriptor of the selected query object determined at step 340 and the descriptor of the selected gallery object determined at step 345 are compared to determine whether the objects have the same identity. In one arrangement, a comparison is performed at step 360 by determining a similarity or dissimilarity score between the descriptors. One example of a dissimilarity score is a Euclidean distance between the descriptors. One example of a similarity score is a Cosine distance between the descriptors. Any other suitable similarity or dissimilarity scores may be determined to compare two descriptors.

One example of determining whether the two objects match (i.e., have the same identity) is to compare a similarity score to a fixed threshold. If a similarity score exceeds the threshold, the query and gallery object are determined to have the same identity.

Another example of determining whether the query object has the same identity as the gallery object is to compare the similarity scores between the query object and all other objects in the video stream. If the similarity score for the gallery object is greater than all other objects, the query and gallery object are determined to have the same identity.

The computer system 150 generates a response if the two objects are determined to have the same identity. In one example, the match is communicated to a user through a graphical user interface. In another example, the response is to tag the gallery object for further automatic analysis, such as tracking the gallery object through the field of view of the gallery camera.

The method 300 concludes after completing the matching step 360.

Figure 4:
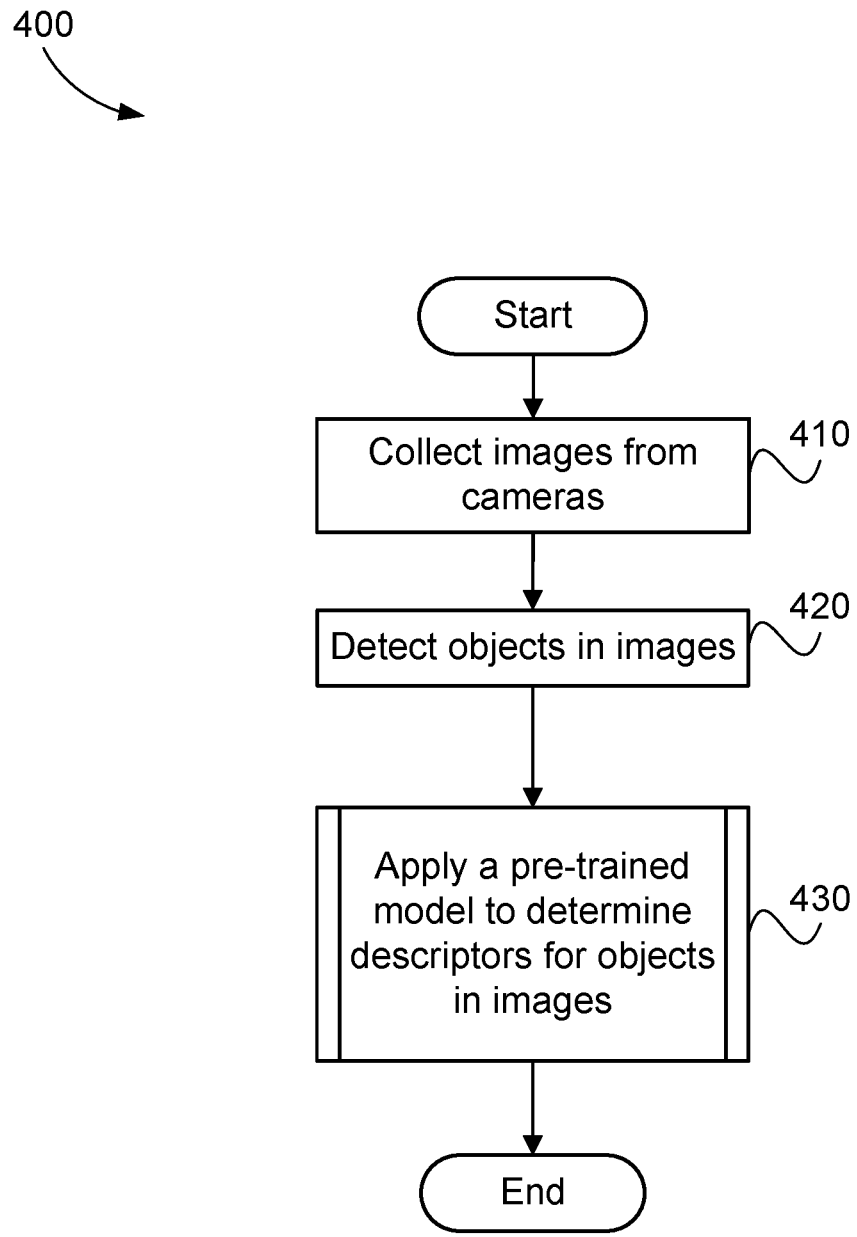
FIG. 4 is a schematic flow diagram of a method of collecting training data and determining descriptors for objects in the training images as used in the method of FIG. 3.

The method 400 of collecting training data and determining descriptors for detected objects in images, as executed at step 303 of method 300, is now described with reference to FIG. 4. Each descriptor forms a representation of a corresponding unlabelled object. Each descriptor is determined from the pixel values in images of the corresponding object. The method 400 is used for generating the representations of the detected objects. The method 400 is typically implemented at least in part as one or more software code modules of the software application program 233 resident in the hard disk drive 210 and being controlled in execution by the processor 205. The method 400 may in some arrangements be executed at least in part on a processor of the computer system 150.

The method 400 starts at a collecting step 410. In execution of the step 410, images containing a plurality of objects are collected from two or more cameras installed in a target domain. For the example application in FIG. 1, cameras 135 and 145 are examples of cameras installed in a target domain, and images 130 and 140 are examples of images containing a plurality of objects. The images collected at step 410 may be stored within the memory 206.

The method 400 passes under execution of the processor 205 from step 410 to a detecting step 420. At step 420, a set of objects is detected in the images from the two or more cameras collected at step 410. In one arrangement, at step 420, objects in the images are detected in a similar manner to step 320 for detecting objects in query images. The output of step 420 is a set of bounding boxes, such as the bounding boxes 105, 106, 107 and 108 corresponding to the objects 100, 101, 102 and 103 respectively in the images 130 and 140. The determined bounding boxes may be stored in the memory 206.

The method 400 passes under execution of the processor 205 from step 420 to a determining step 430, where a descriptor for each detected object is determined by applying the descriptor extractor of a pre-trained person re-identification model to the image region in the bounding box corresponding to the detected object, as determined at step 420. The descriptor is determined in accordance with method 500 which will be described hereinafter with reference to FIG. 5. The output of step 430 is a set of descriptors characterizing the detected objects in the images. The set of descriptors determined at step 430 may be stored in the memory 206.

The method 400 concludes after completing the determining step 430.

Figure 5:
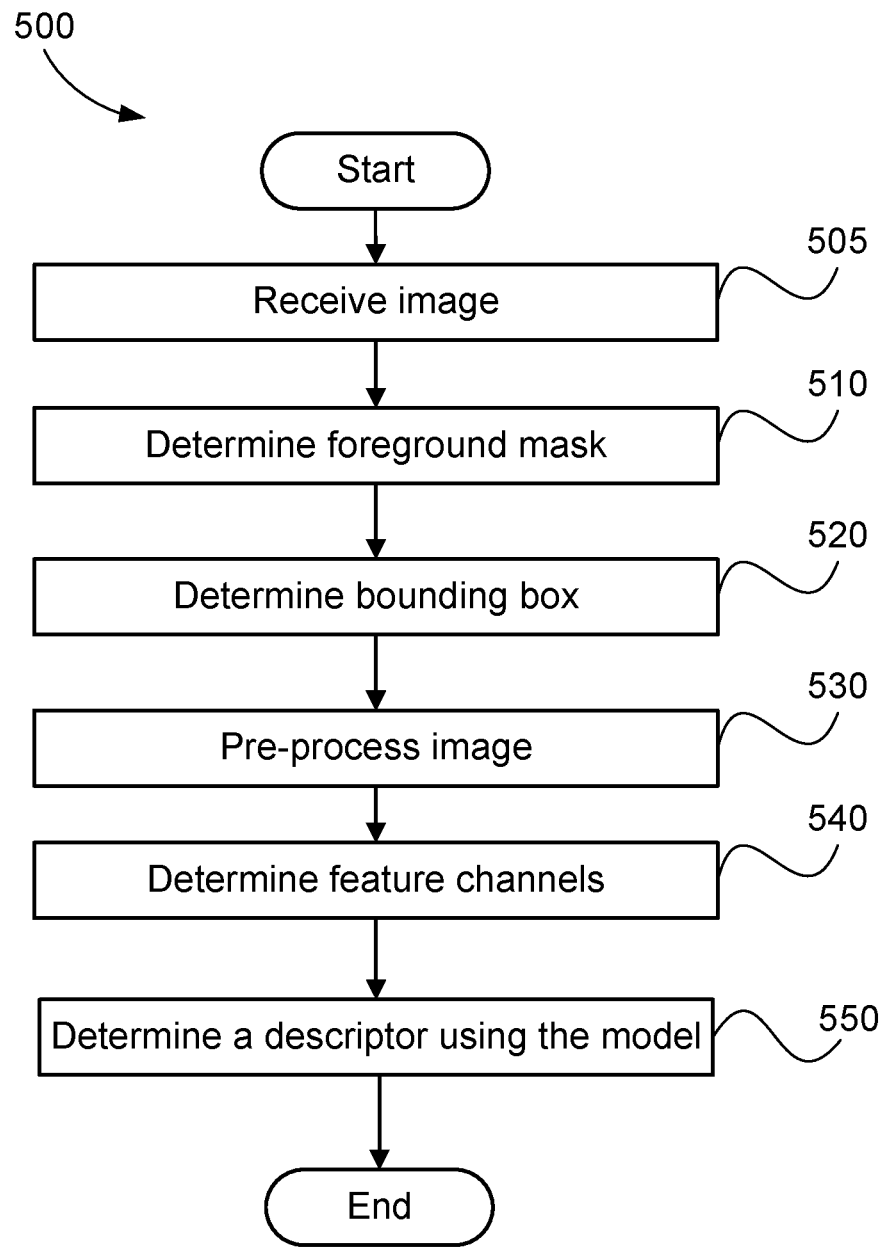
FIG. 5 is a schematic flow diagram of a method of determining an appearance descriptor of an object as used in the method of FIG. 3 and the method of FIG. 4.

The method 500 of determining a descriptor of an object, as executed at the steps 340 and 345 of the method 300 and steps 430 of the method 400, is now described with reference to FIG. 5. The method 500 may be implemented within the module 201 as one or more software code modules of the software application program 233 resident in the hard disk drive 210 and being controlled by execution of the processor 205.

The method 500 starts at a receiving step 505, in which an image or image sequence containing an object and a corresponding bounding box, such as the bounding box selected at step 330 or 335, are received as input. The image or image sequence may be stored in the memory 206. In one arrangement, the bounding box contains the whole body of a person. In one example, when the method 500 is applied to the query object 100 shown in FIG. 1, the image 130 and the bounding box 105 are received at step 505 as input. In another example, the bounding boxes containing head regions of persons are received.

The method 500 passes under execution of the processor 205 from the step 505 to a determining step 510. At step 510, a foreground confidence mask is determined under execution of the processor 205 and may be stored in the memory 206. The foreground confidence mask assigns to each pixel in the bounding box received at step 505 a value indicating a confidence that the pixel belongs to an object. In one arrangement, a foreground confidence mask is determined at step 505 by performing foreground separation using a statistical background pixel modelling method such as Mixture of Gaussian (MoG), wherein the background model is maintained over multiple frames with a static camera.

The method 500 passes under execution of the processor 205 from step 510 to a refining step 520. At step 520, the bounding box received at step 505 is refined to tightly enclose the body of the person, based on the foreground confidence mask determined at step 510. In one arrangement, the bounding box for the head region received at step 505 is converted to a full body bounding box by including the pixels with a foreground confidence value determined at step 510 higher than a per-defined threshold and within a predetermined region of the image based on the head region. One example of a predetermined region is a region of equal width and upper boundary as the head region, and extending down to four (4) times the height of the head region. In another arrangement, the bounding box for the whole body received at step 505 is refined (by shrinking or expanding) to include the pixels with a foreground confidence value determined at the step 510 to be greater than a predefined threshold and within a predetermined distance from the body region. An example of a predetermined distance is a five (5) pixel margin around the bounding box.

The method 500 passes under execution of the processor 205 from step 520 to a pre-processing step 530. In execution of the pre-processing step 530, the image region inside the bounding box determined at step 520 is pre-processed for feature determination. In one arrangement, a weighting scheme is used to weight every pixel of the image region inside the bounding box determined at step 520. One example of the weighting scheme uses a 2-D Gaussian function to weight the pixels based on the spatial locations.

A pixel located close to the centre of the bounding box is assigned higher weight than a pixel located farther from the centre of the bounding box. Another example of the weighting scheme uses the foreground confidence mask determining step 510 to weight the pixels based on the foreground confidence at the corresponding location. In another arrangement, the observed object in the bounding box determined at step 520 is rectified to a vertical orientation, which reduces a variation in the visual appearance of an object due to the viewpoint of the camera. In yet another arrangement, colour normalization is applied to the image inside the bounding box determined at step 520 to compensate for lighting variations across cameras.

The method 500 passes under execution of the processor 205 from step 530 to a determining step 540. At step 540, a plurality of feature channels for the pre-processed image generated in the step 530 are determined under execution of the processor 205. At each feature channel, each pixel in the image is assigned a feature value. In one arrangement, a feature channel is the red colour value at each pixel. In another arrangement, a feature channel is the green colour value at each pixel. In another arrangement, a feature channel is the blue colour value at each pixel. In another arrangement, a feature channel is a local binary pattern (LBP) at each pixel. In another arrangement, a feature channel is an image gradient magnitude at each pixel.

The method 500 passes under execution of the processor 205 from step 540 to a determining step 550. At step 550, the descriptor, also referred to as a feature vector, is determined from the feature channels determined at the step 540 using the descriptor extractor of a person re-identification model 190. The determined appearance descriptor may be stored in the memory 206 under execution of the processor 205.

In one arrangement, the descriptor is determined at step 550 by dividing an image into regions and concatenating a spatial distribution of colour and texture features determined in each region. The colour feature component consists of colour histograms determined independently over a predetermined number of horizontal stripes (e.g., 15 horizontal stripes uniformly spaced from top to bottom of the image), based on the colour feature channels determined at step 540. The shape feature component is a "histogram of oriented gradients" (HOG) descriptor calculated based on the image gradient feature channel determined at step 540. The texture feature component consists of histograms determined independently over predetermined regions (e.g. dividing the image according to a uniform grid), based on the LBP feature channel determined at step 540. The descriptor is formed by concatenating the above components to form a single vector. In one arrangement, the descriptor is replaced with the square root of the values in the descriptor to reduce the effect of noise. In another arrangement, the descriptor is determined at step 550 by encoding appearance as the difference between histograms across pairs of local regions.

In another arrangement, at step 550, the descriptor is transformed by a projection. Each descriptor is projected to a low-dimensional subspace using the projection. One example of a projection is obtained by performing Principal Component Analysis (PCA) on descriptors. Another example of a projection is obtained by performing Locally-Linear Embedding (LLE) on descriptors.

In another arrangement, at step 550, the descriptor is transformed by a nonlinear projection. In one example, a projection is obtained by performing a principal components analysis (PCA) in a reproducing kernel Hilbert space. In another example, a projection is determined using a low rank approximation method (e.g., Nystrom approximation method). A set of representative descriptors are selected from the training dataset and a principal components analysis (PCA) is applied on the representative descriptors to obtain eigenvalues and eigenvectors. The projection of a descriptor is determined using the eigenvalues and eigenvectors and the pairwise similarities between the descriptor to be projected and the representative descriptors.

In yet another arrangement, the descriptor extractor is learned from training images by using a supervised learning method (e.g., a deep convolutional neural network), or an unsupervised learning method (e.g., an auto-encoder). The descriptor for an image is extracted from one or more top layers of a learned deep convolutional neural network or an encoder.

The method 500 concludes after completing the determining step 550. A descriptor is typically in the form of a vector and may also be referred to as a feature vector. The steps 510 to 550 effectively operate to determine feature vectors based on properties of pixels in the received image or sequence of images.

The method 600 of training image selection, as executed at step 305 of the method 300, will now be described with reference to FIG. 6. The method 600 may be used for generating a training sample for matching unlabelled objects in a sequence of images. As described below, the method 600 determines gallery objects (or candidate objects) that are close to a selected anchor image. The method 600 also determines gallery objects that are distant from the anchor image. The method 600 is configured for generating the training sample from at least the anchor image and a matched gallery object (or candidate object). The method 600 may be implemented within the module 201 as one or more software code modules of the software application program 233 resident in the hard disk drive 210 and being controlled by execution of the processor 205.

Figure 7:
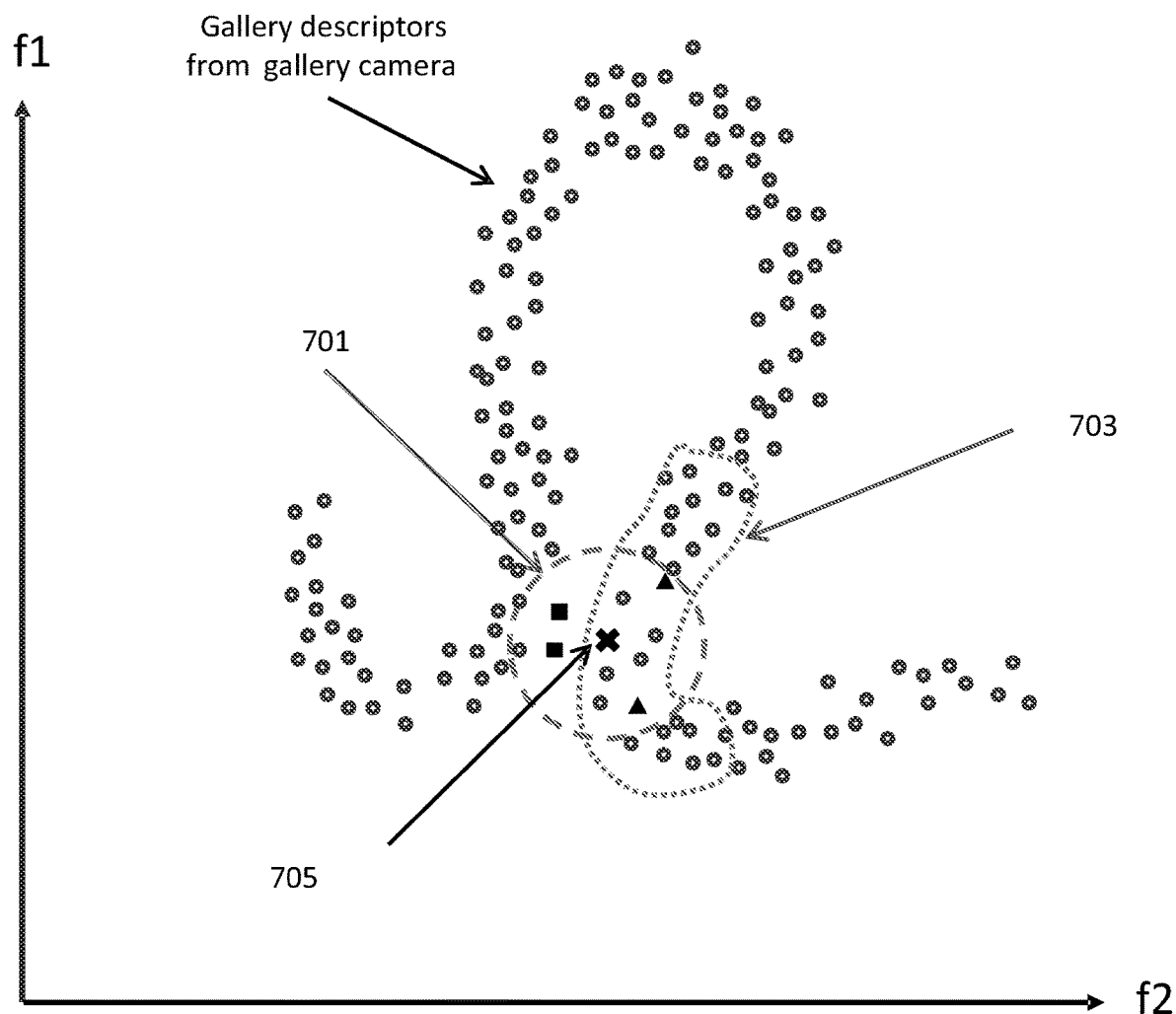
FIG. 7 shows an example of the distribution of appearance descriptors in Euclidean space and manifold space.

The method 600 learns a manifold from received descriptors of query and gallery objects. The manifold is a low dimensional subspace that characterizes the intrinsic structure of the received descriptors. Each query object is treated as an anchor image. The method 600 selects gallery objects based on the nearest neighbour relationship between the anchor image and the gallery objects in the Euclidean space and on the learned manifold. FIG. 7 shows an example of selecting gallery objects for a given query object in a two-dimensional descriptor space. The two-dimensional descriptor space 700 is a Euclidean space describing the distribution of appearance descriptors of gallery objects and the query object or anchor image. Dimensions of the manifold are smaller than dimensions of the two-dimensional descriptor space 700. In the example of FIG. 7, cross (x) 705 represents a query descriptor determined from a bounding box 105 of an image captured by a query camera 135, and the three markers (O, ▲, ■) represent the gallery descriptors determined from images of detected objects captured by a gallery camera 145. In the example of FIG. 7, O represents gallery descriptors from the gallery camera 145. ▲ represents good positive descriptors to the query descriptor. ■ represents good negative descriptors to the query descriptor.

The method 600 determines a first set of nearest neighbours to the query descriptor in Euclidean space. The first set of nearest neighbours are located in a region 701 enclosed by a dash line shown in FIG. 7. In addition, the method 600 learns a manifold from query and gallery descriptors and determines a second set of nearest neighbours to the query descriptor on the learned manifold. The second set of nearest neighbours are located in a region 703 enclosed by the dotted line shown in FIG. 7. The gallery descriptors that are nearest neighbours to the query descriptor in both Euclidean space and the manifold are common nearest neighbours. The method 600 selects a subset of the common nearest neighbours that are further away from the query descriptor than the rest of common nearest neighbours as good positive descriptors. Gallery descriptors represented by the marker (▲) in FIG. 7 are the selected positive descriptors. The gallery descriptors, which are the nearest neighbours to the query descriptor in the Euclidean space but are not the nearest neighbours to the query descriptor on the learned manifold, are referred to as hard negative descriptors. The method 600 selects a subset of the hard negative descriptors that are closer to the query descriptor than the rest of the hard negative descriptors as good negative descriptors. The gallery descriptors represented by the marker (■) in FIG. 7 are the selected negative descriptors. The outputs of the method 600 are a set of positive and negative images corresponding to the selected positive and negative descriptors for each query object or anchor image. Each anchor image and the selected positive and negative images may be used to form a pairwise training sample or a triplet training sample. The training samples are later used by the update step 308 in FIG. 3, where the pre-trained person re-identification model is updated. In one arrangement of updating the model, a projection is learned to minimize a distance between the anchor descriptor and the selected positive descriptor and maximize the distance between the anchor descriptor and the selected negative descriptor in each pairwise training sample. In another arrangement, a set of projections are learned to separate the selected negative descriptors from anchor and the selected positive descriptors in a common subspace. In another arrangement, a set of projections are learned to maximize the correlation between anchor descriptors and the selected positive descriptors in each training sample in a common subspace. In another arrangement, a deep neural network is learned to ensure the distance between the anchor descriptor and the selected positive descriptor in each triplet training sample to be less than the distance between the anchor descriptor and the selected negative descriptor in the same triplet training sample.

The method 600 starts at a receiving step 605 to receive descriptors of query and gallery objects detected in the query image 130 and gallery image 140, respectively from the outputs of step 303 of the method 300. As described below, the method 600 is used for generating a representation of the detected objects using an unsupervised learning method, the unsupervised method learns a manifold of the detected objects.

The method 600 progresses under execution of the processor 205 from step 605 to a determining step 610. At step 610, a projection is determined by applying an unsupervised manifold learning method on the received descriptors. The learned projection allows descriptors to be projected to a subspace which characterizes the intrinsic structure of the distribution of the descriptors. The learned subspace is known as a manifold where the similarity or dissimilarity between two descriptors is more accurate than the Euclidean distance between the two descriptors in the Euclidean space. Dimensions of the learned subspace are smaller than a number of dimensions of the Euclidean space. As described below, training samples may be generated for training the unsupervised manifold learning method. In one arrangement, a manifold is learned using the dictionary learning method with a manifold regularisation, which finds a dictionary by simultaneously minimizing reconstruction errors and maintaining the nearest neighbour relationship between descriptors. In an alternative arrangement, a manifold is learned using cross-view asymmetric metric learning, which learns a specific projection for each camera view by grouping appearance descriptors to a set of clusters using a clustering algorithm (e.g., K-means algorithm). With the learned projections, appearance descriptors from different camera views are projected to a shared subspace where a better re-identification performance may be achieved.

The method 600 progresses under execution of the processor 205 from step 610 to a determining step 620. At step 620, the received descriptors are projected to a subspace using the projection learned at step 610. The outputs of step 620 are the projected descriptors of the query and gallery objects. As described above, the gallery objects may also be referred to as candidate objects.

The method 600 progresses under execution of the processor 205 from step 620 to a decision step 630, which determines whether there are more query objects to be processed. If all the query objects have been processed, then the method 600 terminates and outputs all the training samples to be used in a subsequent step 308 of the method 300 for updating a re-identification model. If there are more query objects needed to be processed, then the method 600 selects positive and negative images for each query object.

In one arrangement, the method 600 selects a query object and performs steps 640 to 690 on the selected query object. Steps 640 to 690 are repeated until all the query objects are processed by method 600.

In another arrangement, the method 600 selects a subset of query objects for selecting positive and negative training images.

The method 600 progresses under execution of the processor 205 from step 630 to a determining step 640. In step 640, cross-view distances from the query descriptor to all the gallery descriptors on the manifold learned at step 610 are determined under execution of the processor 205. Given the projected query descriptor $f_{query}$ and the projected gallery descriptor $f_{gallery}$, the cross view distance between $f_{query}$ and $f_{gallery}$ is determined, in accordance with Equation (1), as follows:

$$\|f_{query} - f_{gallery}\|_2^2 \qquad (1)$$

The cross-view distance measures the dissimilarity between the query object and a gallery object. A small cross-view distance indicates the appearance of two objects that are similar, whereas a large cross-view distance indicates the appearance of two objects that are vastly different.

The method 600 progresses under execution of the processor 205 from step 640 to a determining step 650. In step 650, a first set of the k-nearest cross-view neighbours $N_s$ for the query object is determined based on the cross-view distances determined at step 640. The number of nearest neighbours, k, is predetermined (e.g., k=20).

Figure 6:
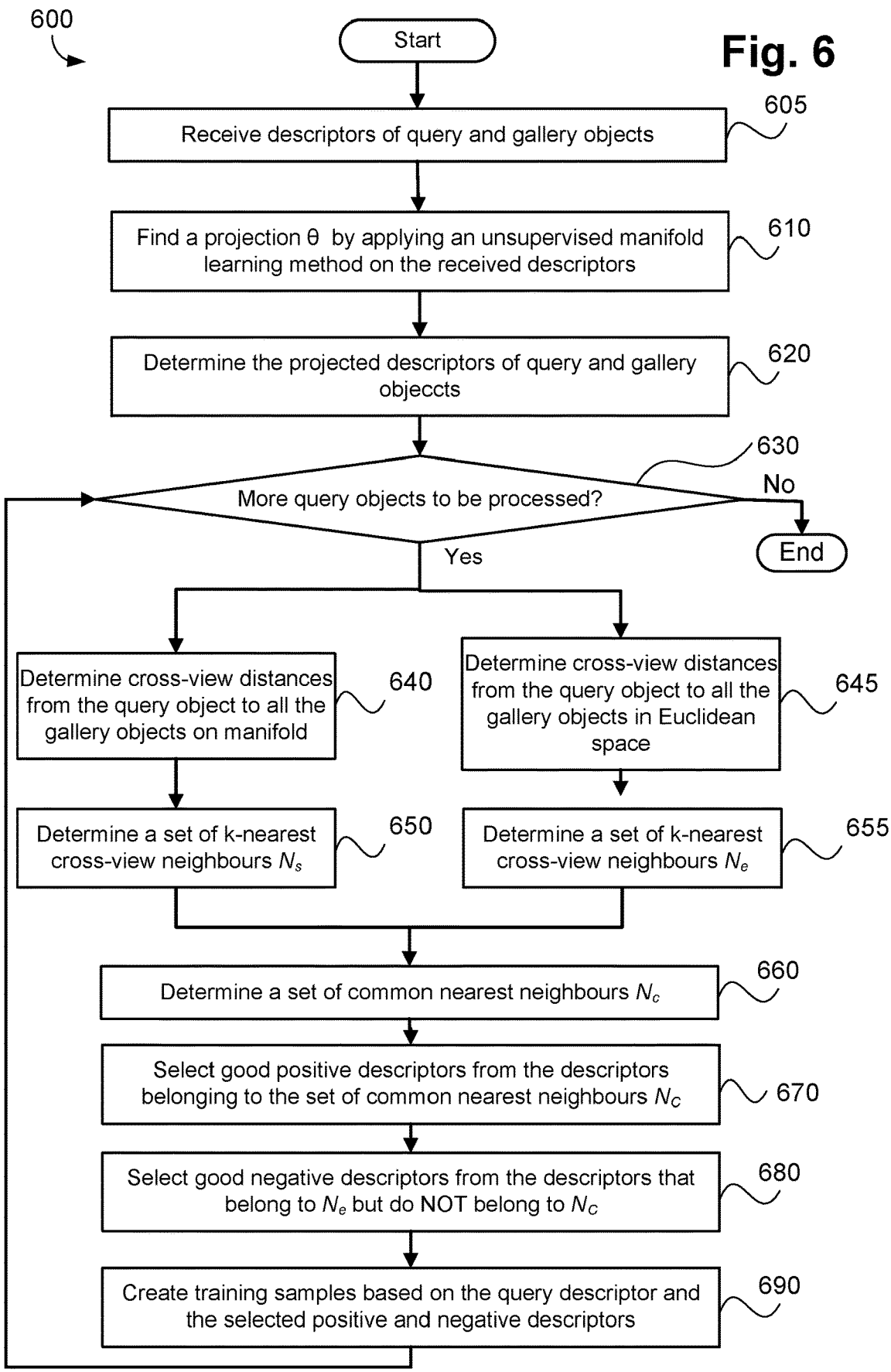
FIG. 6 is a schematic flow diagram of a method of training image selection as used in the method of FIG. 3.

As seen in FIG. 6, the method 600 also progresses from step 630 to a determining step 645. In one arrangement, steps 640 and 645 start concurrently. In another arrangement, steps 640 and 645 are executed at different times. Steps 650 and 655 are executed before step 660.

At step 645, cross-view distances from the query descriptor to all the gallery descriptors in the Euclidean space are determined under execution of the processor 205. Step 645 is substantially similar to step 640, except that the cross-view distances between the query descriptor and gallery descriptors are determined using a Euclidean distance metric.

The method 600 then progresses under execution of the processor 205 from step 645 to a determining step 655. In step 655, a second set of the k-nearest cross-view neighbours $N_e$ for the query object are determined based on the cross-view distances determined at step 645. Step 655 is substantially similar to step 650. The number of nearest neighbours is predetermined (e.g., 20).

Following the steps 650 and 655, the method 600 progresses under execution of the processor 205 to determining step 660. In step 660, a set of common nearest neighbours $N_c$ is determined from the first set of nearest neighbours $N_s$ and the second set of nearest neighbours $N_e$ determined at steps 650 and 655, respectively. The outputs of step 660 are a set of gallery objects that are considered to be similar to the query object in both Euclidean space and the manifold learned at step 610.

The method 600 then progresses under execution of the processor 205 from step 660 to a selection step 670. In step 670, the set of the common nearest neighbours $N_c$ determined at step 660 and the cross-view distances between the query object and the gallery objects belonging to the set $N_c$ determined in step 640 are received under execution of the processor 205. The cross-view distances are sorted in a descending order and n gallery descriptors with the largest cross-view distances to the query descriptor are selected as good positive descriptors. The number of gallery descriptors n is predetermined (e.g., 2). The output of step 670 is the n selected gallery descriptors for the query object. To avoid outliers in the training samples, the cross-view distances between the selected gallery descriptors and the query descriptor are compared to a predetermined threshold (e.g., 0.5). If the cross-view distance between a selected gallery descriptor and the query descriptor is larger than the predetermined threshold, then the selected gallery descriptor is removed for further processing.

The method 600 progresses under execution of the processor 205 from step 670 to a selection step 680. In step 680, the query descriptor, the set of the common nearest neighbours $N_c$ determined at step 660, the second set of the k-nearest cross-view neighbours $N_e$ determined at 655, and the cross-view distances in the Euclidean space determined at step 645, are received under execution of the processor 205. The gallery descriptors that belong to the set $N_e$ but do not belong to the set $N_c$ are selected and the cross-view distances between the selected gallery descriptors and the query descriptor are sorted in an ascending order. m gallery descriptors with the smallest cross-view distances to the query descriptor are selected at step 860 as good negative descriptors. The number of gallery descriptors m is predefined, e.g., 2. The output of step 680 is the m selected gallery descriptors for the query object.

The method 600 progresses under execution of the processor 205 from step 680 to a generating step 690. In step 690, training samples are generated using the query image corresponding to the query descriptor and the gallery images corresponding to the good positive and negative descriptors selected at step 670 and step 680, respectively. In one arrangement, a pairwise training sample may be generated using the query image as an anchor image and one of the selected positive images or one of the selected negative images. In another arrangement, a triplet training sample may be generated using the query image as an anchor image, one of the selected positive images, and one of the selected negative image.

The method 600 then returns to step 630 following step 690 to process the remaining query objects.

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

The invention claimed is:

1. A method of generating a training sample for matching unlabelled objects in a sequence of images, comprising:
  generating a first representation of unlabelled objects from images of a first and second set of images;
  generating a second representation of the unlabelled objects using an unsupervised method, the unsupervised method learning a manifold of the unlabelled objects in the first representation;
  selecting an anchor image in the first set;
  determining a first set of candidate images in the second set that are close to the anchor image in both the first and second representations;
  determining a second set of candidate images in the second set that are distant from the anchor image in either the first or the second representations;
  selecting a match candidate image from the first set or the second set of candidate images; and
  generating the training sample from at least the anchor image and the match candidate image.

2. The method according to claim 1, wherein dimensions of the second representation are smaller than a first number of dimensions of a space of the first representation.

3. The method according to claim 1, wherein the generated training samples are used for training the unsupervised method.

4. The method according to claim 1, wherein a space of the first representation is Euclidean space.

5. The method according to claim 1, wherein the sequence of image is captured by a capturing device.

6. The method according to claim 1, wherein the first candidate images are used for training the unsupervised method as a good positive samples.

7. The method according to claim 1, wherein the second candidate images are used for training the unsupervised method as a good negative samples.

8. A system for generating a training sample for matching unlabelled objects in a sequence of images, the system comprising:
  a memory for storing data and a computer program;
  a processor coupled to the memory for executing the computer program, the program comprising instructions for:
    generating a first representation of unlabelled objects from images of a first and second set of images;
    generating a second representation of the unlabelled objects using an unsupervised method, the unsupervised method learning a manifold of the unlabelled objects in the first representation;
    selecting an anchor image in the first set;
    determining a first set of candidate images in the second set that are close to the anchor image in both the first and second representations;
    determining a second set of candidate images in the second set that are distant from the anchor image in either the first or the second representations;
    selecting a match candidate image from the first set or the second set of candidate images; and generating the training sample from at least the anchor image and the match candidate image.

9. An apparatus for generating a training sample for matching unlabelled objects in a sequence of images comprising:
   a processor; and
   a memory storing an executable instruction which, when executed by the processor cause the apparatus to perform operations:
   generating a first representation of unlabelled objects from images of a first and second set of images;
   generating a second representation of the unlabelled objects using an unsupervised method, the unsupervised method learning a manifold of the unlabelled objects in the first representation;
   selecting an anchor image in the first set;
   determining a first set of candidate images in the second set that are close to the anchor image in both the first and second representations;
   determining a second set of candidate images in the second set that are distant from the anchor image in either the first or the second representations;
   selecting a match candidate image from the first set or the second set of candidate images; and
   generating the training sample from at least the anchor image and the match candidate image.

10. A non-transitory computer readable medium having a computer program stored on the medium for generating a training sample for matching unlabelled objects in a sequence of images, the program comprising:
   code for generating a first representation of unlabelled objects from images of a first and second set of images;
   code for generating a second representation of the unlabelled objects using an unsupervised method, the unsupervised method learning a manifold of the unlabelled objects in the first representation;
   code for selecting an anchor image in the first set;
   code for determining a first set of candidate images in the second set that are close to the anchor image in both the first and second representations;
   code for determining a second set of candidate images in the second set that are distant from the anchor image in either the first or the second representations;
   code for selecting a match candidate image from the first set or the second set of candidate images; and
   code for generating the training sample from at least the anchor image and the match candidate image.

11. A method of identifying an object in an image captured in a first scenario and a second scenario having different viewpoints or environments to the first scenario, the method comprising:
   inputting a data set including images of an object captured in the first scenario and the second scenario, the images including at least images of the object captured in the first scenario and the second scenario; and
   identifying an object in the first scenario and the second scenario using a machine learning model trained using the data set to match images being common nearest neighbours which are distant from an anchor image and a manifold of the object in an Euclidean space, wherein images that are closest to the anchor image in the Euclidean space and are not nearest neighbours to the anchor image or the manifold are considered not to match.

12. An apparatus for identifying an object in an image captured in a first scenario and a second scenario having different viewpoints or environments to the first scenario comprising:
   a processor; and
   a memory storing an executable instruction which, when executed by the processor, cause the apparatus to perform operations:
   inputting a data set including images of an object captured in the first scenario and the second scenario, the images including at least images of the object captured in the first scenario and the second scenario; and
   identifying an object in the first scenario and the second scenario using a machine learning model trained using the data set to match images being common nearest neighbours which are distant from an anchor image and a manifold of the object in an Euclidean space, wherein images that are closest to the anchor image in the Euclidean space and are not nearest neighbours to the anchor image or the manifold are considered not to match.

13. A system for identifying an object in an image captured in a first scenario and a second scenario having different viewpoints or environments to the first scenario, the system comprising:
   a memory for storing data and a computer program;
   a processor coupled to the memory for executing the computer program, the program comprising instructions for:
   inputting a data set including images of an object captured in the first scenario and the second scenario, the images including at least images of the object captured in the first scenario and the second scenario;
   identifying an object in the first scenario and the second scenario using a machine learning model trained using the data set to match images being common nearest neighbours which are distant from an anchor image and a manifold of the object in an Euclidean space, wherein images that are closest to the anchor image in the Euclidean space and are not nearest neighbours to the anchor image or the manifold are considered not to match.

14. A non-transitory computer readable medium having a program stored on the medium for identifying an object in an image captured in a first scenario and a second scenario having different viewpoints or environments to the first scenario, the program comprising:
   code for inputting a data set including images of an object captured in the first scenario and the second scenario, the images including at least images of the object captured in the first scenario and the second scenario; and
   code for identifying an object in the first scenario and the second scenario using a machine learning model trained using the data set to match images being common nearest neighbours which are distant from an anchor image and a manifold of the object in an Euclidean space, wherein images that are closest to the anchor image in the Euclidean space and are not nearest neighbours to the anchor image or the manifold are considered not to match.

* * * * *